(No Model.) 2 Sheets—Sheet 1.
W. H. SNOW.
GAS RETORT FURNACE.
No. 462,021. Patented Oct. 27, 1891.
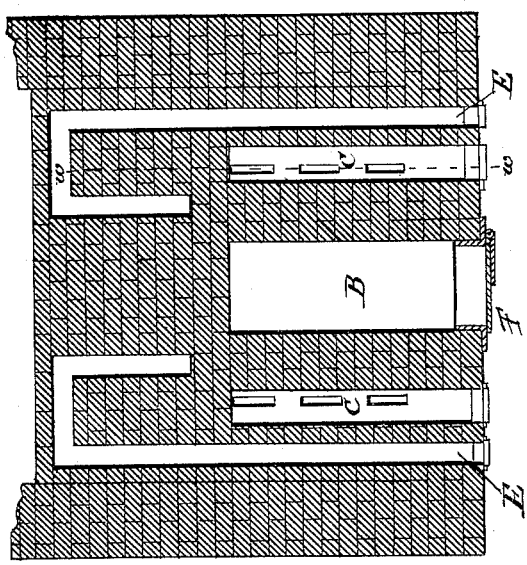
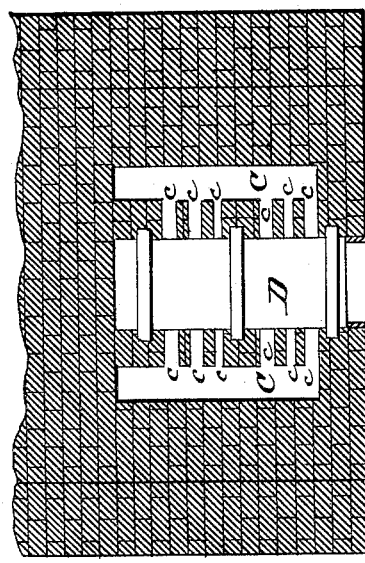
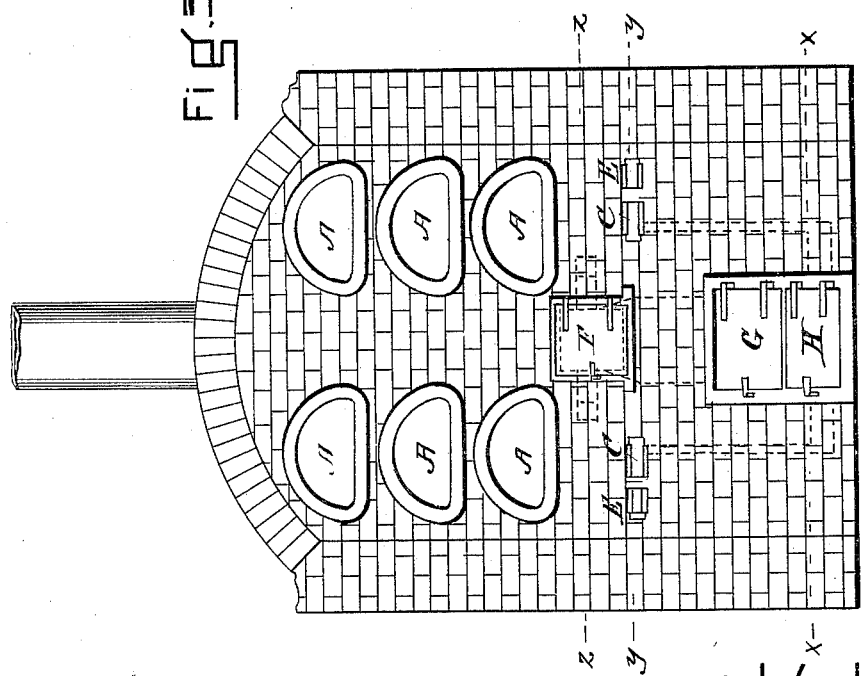
WITNESSES
Frank G. Parker
Eva A. Guild
INVENTOR
Wm. H. Snow
by George O. G. Coale
his Attorney (No Model.) 2 Sheets—Sheet 2.
W. H. SNOW.
GAS RETORT FURNACE.
No. 462,021. Patented Oct. 27, 1891.
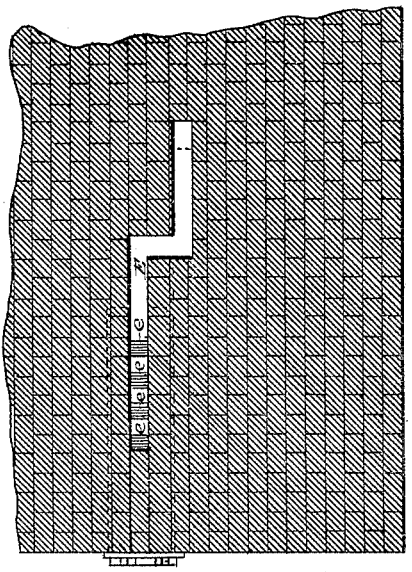
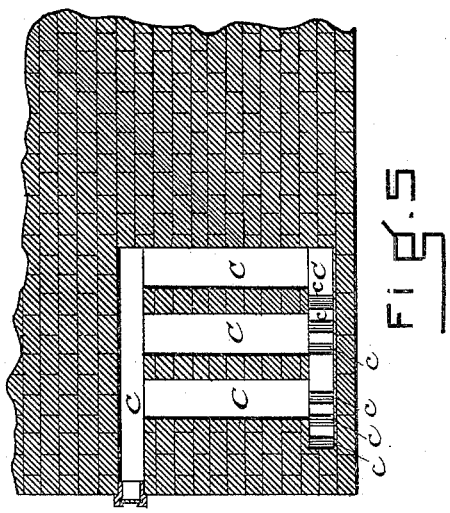
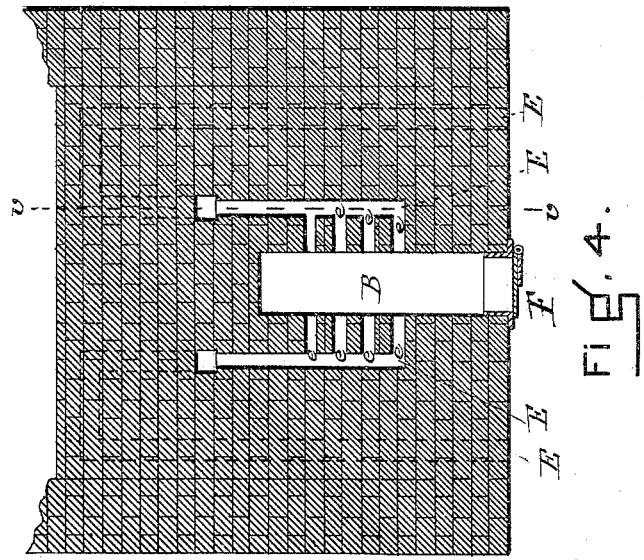
WITNESSES
Frank G. Parker
Eva A. Guild
INVENTOR
Wm. H. Snow
by George O. G. Coale